· US005912699A

United States Patent [19]
Hayenga et al.

[11] Patent Number: 5,912,699
[45] Date of Patent: Jun. 15, 1999

[54] METHOD AND APPARATUS FOR RAPID CAPTURE OF FOCUSED MICROSCOPIC IMAGES

[75] Inventors: Jon W. Hayenga; Louis R. Piloco, both of Kent, Wash.

[73] Assignee: NeoPath, Inc., Redmond, Wash.

[21] Appl. No.: 08/302,355

[22] Filed: Sep. 7, 1994

Related U.S. Application Data

[63] Continuation-in-part of application No. 07/838,063, Feb. 18, 1992, abandoned.

[51] Int. Cl.$^6$ ........................................................ H04N 7/18
[52] U.S. Cl. ............................ 348/132; 348/79; 348/133
[58] Field of Search .............................. 348/132, 79, 217, 348/319, 221, 133, 125, 121, 127, 186; H04Y 7/18

[56] References Cited

U.S. PATENT DOCUMENTS

| | | | |
|---|---|---|---|
| 3,629,499 | 12/1971 | Carlson | 348/607 |
| 3,721,759 | 3/1973 | Lang | 348/79 |
| 3,800,078 | 3/1974 | Cochran et al. | 358/482 |
| 3,978,280 | 8/1976 | Kavanagh et al. | 348/79 |
| 4,045,772 | 8/1977 | Bouton et al. | 348/79 |
| 4,220,850 | 9/1980 | McEachern | 250/204 |
| 4,283,766 | 8/1981 | Snyder et al. | 364/525 |
| 4,341,953 | 7/1982 | Sakai et al. | 354/406 |
| 4,349,254 | 9/1982 | Jyojiki et al. | 354/406 |
| 4,352,545 | 10/1982 | Uno et al. | 354/406 |
| 4,414,469 | 11/1983 | Ogasawara | 250/201.2 |
| 4,500,925 | 2/1985 | Hanma et al. | 348/356 |
| 4,544,953 | 10/1985 | Goldman | 358/227 |
| 4,577,095 | 3/1986 | Watanabe | 250/201.2 |
| 4,626,674 | 12/1986 | Oinoue | 250/201.8 |
| 4,636,051 | 1/1987 | Shippey | 354/402 |
| 4,673,988 | 6/1987 | Jansson et al. | 348/79 |
| 4,680,635 | 7/1987 | Khurana | 348/217 |
| 4,700,298 | 10/1987 | Palcic et al. | 382/128 |
| 4,725,722 | 2/1988 | Maeda et al. | 356/373 |
| 4,789,898 | 12/1988 | Zwirn et al. | 348/354 |
| 4,851,914 | 7/1989 | Pfanhouser et al. | 348/319 |
| 4,887,125 | 12/1989 | Hideshima | 355/55 |
| 4,948,247 | 8/1990 | Lapeyre | 356/23 |
| 4,980,778 | 12/1990 | Wittman | 358/446 |
| 5,051,770 | 9/1991 | Cornuejols | 348/239 |
| 5,073,857 | 12/1991 | Peters et al. | 348/79 |
| 5,084,772 | 1/1992 | Shimoyama | 358/461 |
| 5,089,713 | 2/1992 | Vala et al. | 250/566 |
| 5,101,277 | 3/1992 | Kanata | 348/79 |
| 5,111,116 | 5/1992 | Takeda | 315/241 |
| 5,198,668 | 3/1993 | Yamada | 250/310 |
| 5,204,761 | 4/1993 | Gusmano | 358/461 |
| 5,229,856 | 7/1993 | Koshiishi | 348/312 |
| 5,315,700 | 5/1994 | Johnston et al. | 395/163 |
| 5,361,140 | 11/1994 | Hayenga et al. | 348/255 |
| 5,432,552 | 7/1995 | Takuma et al. | 348/349 |
| 5,504,584 | 4/1996 | Soeda | 348/221 |

Primary Examiner—Tommy P. Chin
Assistant Examiner—Vu Le
Attorney, Agent, or Firm—Leone & Moffa, P.A.

[57] ABSTRACT

A high speed image capture apparatus includes a camera with an integration period between consecutive flashes of an illuminating light pulse, where the camera has an image read out period and an image output. A timer for provides a strobe output representative of the start of a flash. An image capture apparatus captures a first image during the integration period and a second image within a predetermined time after capturing the first image but before the image read out period has elapsed so as to substantially increase a rate of producing usable image outputs. The image capture apparatus is coupled to the strobe output and the image output.

17 Claims, 11 Drawing Sheets

METHOD AND APPARATUS FOR RAPID CAPTURE OF FOCUSED MICROSCOPIC IMAGES

CROSS-REFERENCE TO RELATED APPLICATION

This is a continuation-in-part of application Ser. No. 07/838,063 filed on Feb. 18, 1992, now abandoned.

FIELD OF THE INVENTION

The present invention is directed toward devices for providing image signals representing an image of an object and, more particularly, apparatus for rapidly capturing focused image signals.

BACKGROUND OF THE INVENTION

Systems for providing image signals typically include a camera positioned to be focused upon an object and constructed for providing image signals representing an image of the object. Typically, these systems include apparatus for monitoring the image signals and for varying the focus of the camera to provide a focused image signal. However, in such systems, it is not possible to obtain a focused image if any significant relative motion exists between the image and the camera while the image is being obtained.

To eliminate the effect of relative motion between the camera and the object, prior art systems typically require an unacceptably long waiting period, or settling time, for all relative motion between the camera and the object to stop before the image is obtained. Accordingly, it is desirable to provide a camera system capable of obtaining focussed image signals wherein a camera system moves in relation to the object.

Further, even when the object or the camera is not in relative motion, the above-referenced camera systems require an unacceptably long time to focus the camera. This is because the above-described focusing mechanism requires a focused signal to be received before the proper focusing position of the camera can be determined. Accordingly, the focus of the camera must be varied until an acceptably focused image signal is received, before the desired image signal can be obtained. This procedure is unacceptable and tedious. The focus time of these systems is further increased since changing the focus causes vibration that must be stopped before the desired image signals can be obtained. It is desirable, therefore, to provide a camera system capable of determining the proper focus position of the camera without the necessity of receiving focused image signals.

Several prior art systems have attempted to reduce the time required to focus a camera by obtaining a preliminary image. These systems then use data processing methods to determine whether the preliminary image was in focus and, if not, to determine the proper focus of the image. However, such systems still require a settling time before the preliminary image can be obtained. Further, these systems require that the entire image be obtained before a determination of focus can be made. Also, if the preliminary image is determined to be out of focus, the entire process must be repeated, before the camera is moved, to obtain the in-focus image.

Still further, obtaining image signals representing a plurality of objects with the above-referenced camera system is time-consuming because each object must be focused and the focused image signals must be provided before an image of the next object can be taken. The time wasted focusing upon a single object and waiting for relative motion to stop is multiplied by the number of objects for which image signals are desired. Therefore, these systems become even more unacceptable as the number of objects increases.

Accordingly, it is it is an object of this invention to provide a camera system wherein a large number of image signals can be obtained rapidly. It is a further object of the invention to capture an image in every video frame.

One aspect of the invention of particular interest is a motion control apparatus that operates to send a scan synchronization signal to image capture apparatus, where the scan synchronization signal indicates that the motion control apparatus will position a slide at a selected set of coordinates for scanning within a precisely specified time interval, where the motion control apparatus provides the scan synchronization signal prior to the motion control apparatus actually moving the slide into position.

Other objects, features and advantages of the present invention will become apparent to those skilled in the art through the description of the preferred embodiment, claims and drawings herein wherein like numerals refer to like elements.

SUMMARY OF THE INVENTION

A high speed image capture apparatus includes a camera with an integration period between consecutive flashes of an illuminating light pulse, where the camera has an image read out period and an image output. A timer for provides a strobe output representative of the start of a flash. An image capture apparatus captures a first image during the integration period and a second image within a predetermined time after capturing the first image but before the image read out period has elapsed so as to substantially increase a rate of producing usable image outputs. The image capture apparatus is coupled to the strobe output and the image output.

In one preferred embodiment of the invention, a camera system is provided for obtaining a signal representing a focused image of an object. The camera system includes a camera assembly responsive to a focus signal for focusing on a focal point to provide an image signal indicative of the image of the object. The camera assembly is also constructed to provide an offset focus signal focusing the camera assembly on an offset focal point displaced from the focal point by a predetermined distance. The camera system further includes a focus signal processor for determining the band-pass frequency component of the offset focus signal to provide the focus signal so that the image signal provided by the camera assembly will be representative of a focused image of the object.

In another presently preferred embodiment of the invention, a light assembly is constructed for providing light to illuminate the object and to provide a light signal indicative of the intensity of the light provided. The camera system also includes a camera assembly for providing an image signal indicative of the image of the object. The camera system also includes a data processor responsive to the light signal for altering the image signal so that the image signal is corrected for variations in intensity of the flash of light.

In another preferred embodiment, notice is provided to the video camera prior to the time the slide is positioned at the designated position. The notice corresponds to 1.5 video frame times so that an image may be captured in every video frame. Advance notification permits the camera to synchronize operation with the strobe and the mechanical positioning of the slide without corrupting timing of the camera.

BRIEF DESCRIPTION OF THE DRAWINGS

To illustrate this invention, a preferred embodiment will be described herein with reference to the accompanying drawings.

DETAILED DESCRIPTION OF THE PREFERRED EMBODIMENT

The subject invention provides a camera system for rapidly obtaining focused images of an object. The camera system of the subject invention may be used in various imaging devices as will be apparent to those skilled in the art. In a presently preferred embodiment of the invention, the camera system disclosed herein is used in a system for analyzing cervical pap smears, such as that shown and disclosed in U.S. patent application Ser. No. 07/838,064, entitled "Method For Identifying Normal Biomedical Specimens", by Alan C. Nelson, et al., filed Feb. 18, 1992; U.S. patent application Ser. No. 07/838,395, entitled "Method For Identifying Objects Using Data Processing Techniques", by S. James Lee, et al., filed Feb. 18, 1992; and U.S. patent application Ser. No. 07/838,070, now U.S. Pat. No. 5,315,700, entitled "Method And Apparatus For Rapidly Processing Data Sequences", by Richard S. Johnston, et al., filed Feb. 18, 1992; the disclosures of which are incorporated herein, in their entirety, by the foregoing references thereto.

Figure 1:
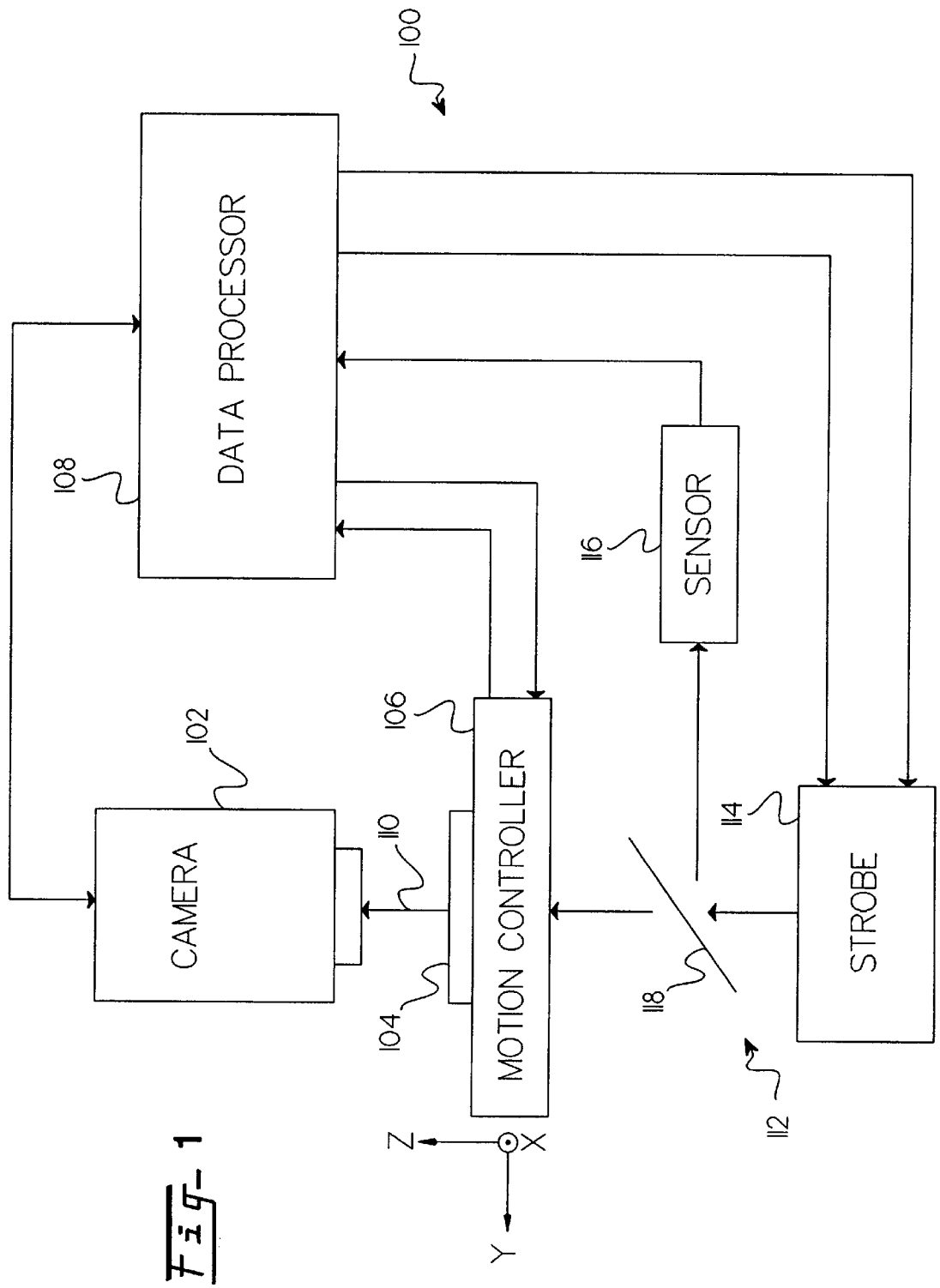
FIG. 1 is an illustrative block diagram of the camera system that is the subject of the present invention.

A camera system 100 constructed in accordance with the subject invention is illustrated in FIG. 1. Therein, a camera assembly 102 is positioned to obtain an image of a slide 104 mounted to a motion controller 106. In a presently preferred embodiment of the invention, the slide 104 is constructed for receiving a slide-mounted medical specimen and the camera system 100 is provided for obtaining image signals of the medical specimen. Cameras used in the system may comprise SONY model XC77 (TM) CCD cameras having a frame rate in the range of 25 to 30 frames per second. However, as will be apparent to those skilled in the art upon a reading of the following detailed description of the invention, the subject invention may be used with camera systems constructed for obtaining image signals of a wide variety of objects.

The motion controller 106 includes a stage for receiving the slide 104 and is responsive to a slide scan signal, received from a data processor 108, for moving the stage in a slide plane represented by X and Y directions. In the illustrative diagram of FIG. 1, the X and Y directions are located in the plane that is perpendicular to an optical path 110 intermediate the slide 104 and the camera 102. The motion controller 106 is further responsive to a slide focus signal for moving the slide 104 in a direction normal to the slide plane, along the optical path 110, for focusing the camera upon the slide 104. The motion controller 106 is constructed to provide a position signal to the data processor 108 wherein the position signal is indicative of the X, Y, and Z position of the slide 104. Motion controllers for performing the above-described functions are known in the art and a suitable motion controller may be selected by those skilled in the art.

The camera assembly 102 is constructed to provide an image signal indicative of the optical transmissivity of the specimen on the slide 104. The image signal from the camera assembly 102 is obtained by focusing the camera assembly 102 on a focal point positioned a first distance along the optical path 110. The camera assembly 102 is further constructed to provide an above focus image signal and a below focus image signal, referred to herein as a focus plus and a focus minus signal, respectively. The focus plus signal is provided by focusing the camera assembly on a focal point positioned a second distance along the optical path 110 wherein the length of the second distance is greater than the length of the first distance. The focus minus signal is provided by focusing the camera assembly on a focal point positioned a third distance along the optical path 110 wherein the length of the third distance is less than the length of the first distance. The image signal, focus plus signal, and focus minus signal are each provided to the data processor 108.

The data processor 108 uses the focus plus signal and the focus minus signal to determine the positioning of the slide 104 along the optical path 110 necessary for focusing the specimen so that the image signal provided by the camera 102 will be in focus. More particularly, the data processor 108 determines whether the received signal is of a magnitude large enough to focus, whether the image plane lies within the correctable region, and which direction to move the slide 104 to focus the image.

Figure 2:
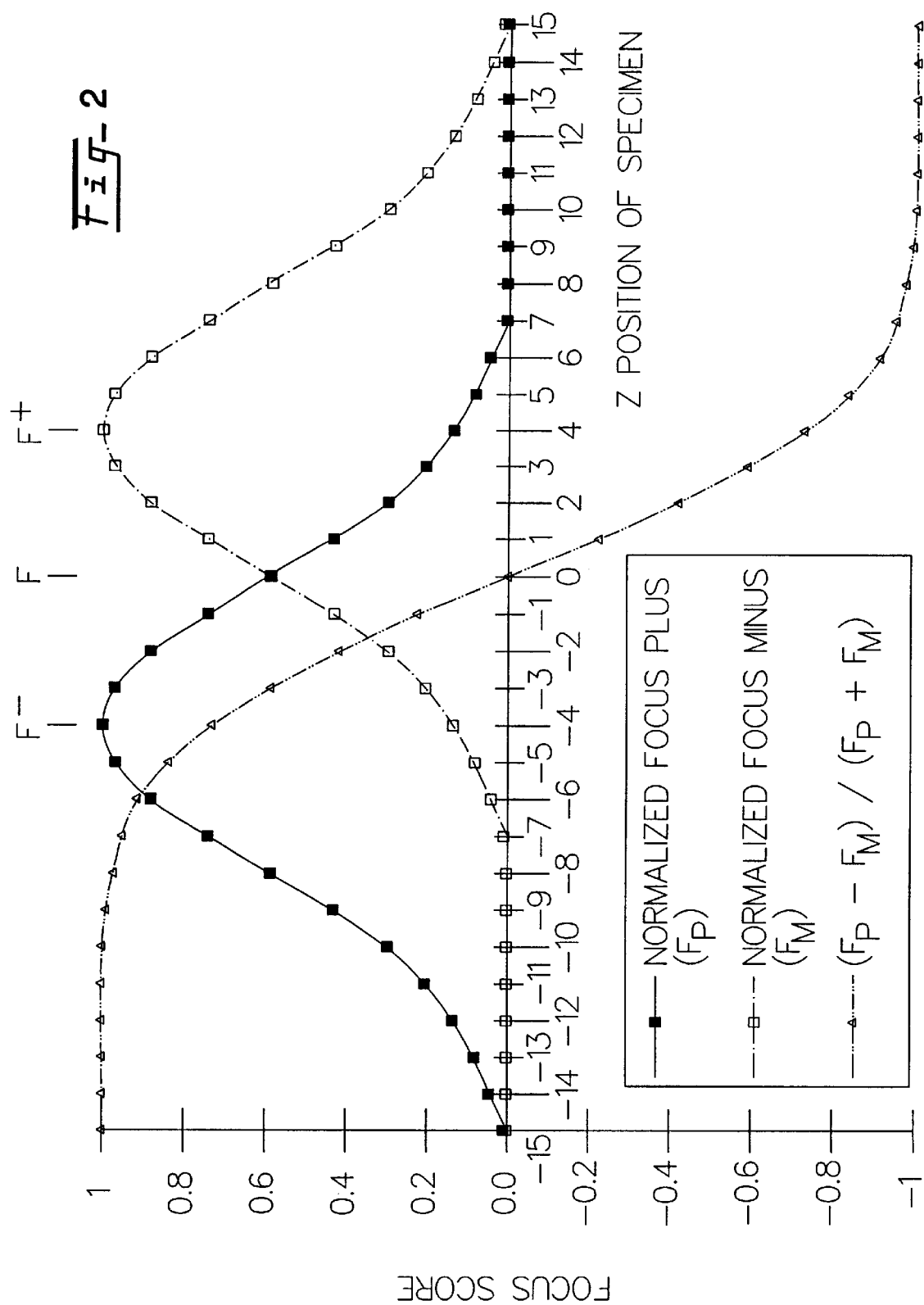
FIG. 2 is a graph illustrating the relationship between the passband frequency component of the signal provided by the camera assembly of FIG. 1 and the focus of the camera assembly.

Generally, the data processor 108 determines the magnitude of the band-pass frequency energy in the focus plus and focus minus signals. As illustrated in FIG. 2, the image signal will be in focus when the band-pass frequency energy of the focus plus and focus minus signals are substantially equal. Accordingly, to determine the proper positioning of the slide 104 along the optical path 110, the data processor 108 need only determine how far the slide must be displaced for the energy provided by the focus plus and focus minus signals to be substantially equal. It will be apparent to those skilled in the art that the relative positioning of the focal point of the camera assembly when providing the focus plus signal and focus minus signal is determinative of the relationship between their band-pass frequency energy components and the positioning of the camera assembly for providing a focused image signal.

So that the image signals may be obtained more rapidly, the data processor 108 is constructed to provide the scan signal to position the motion controller 106 in a plurality of X-Y positions to obtain a plurality of image signals indicative of a respective plurality of images of a portion of the specimen on the slide 104. The data processor 108 may be further constructed to determine the proper positioning of the slide 104 along the optical path 110 for each of the plurality of image signals obtained. After each of the plurality of image signals has been obtained, the data processor 108 can determine whether the slide is focused by examining the band-pass frequency component of the focus plus signal and the focus minus signal, as discussed above. If the image signals were not focused, the data processor 108 will determine the proper positioning of the slide for focus and will provide the scan signal to the motion controller 106 to re-position the slide 104 in the X-Y positions of the portions not focused and, simultaneously, provide the slide focus signal to the motion controller 106 to obtain the proper positioning of the slide 104 along the optical path 110 so that focused image signals are obtained.

A strobe assembly 112 is provided for selectively illuminating the slide 104 at the time that the image signals are obtained by the camera 102. The strobe assembly 112 includes a strobe unit 114 that is responsive to a pulse signal from the data processor 108 for providing a flash of light. The strobe unit 114 is further responsive to an intensity signal received from the data processor 108 for varying the intensity of the flash of light provided, as will be discussed in further detail below. The strobe unit 114 is positioned to illuminate the slide 104 with the flash of light. In the illustrative diagram of FIG. 1, the slide 104 is positioned intermediate the strobe unit 114 and the camera 102 so that the flash of light is provided along an optical path the same as the optical path 110.

The strobe assembly 112 further includes a photodetector sensor 116 that is positioned to receive a portion of the flash of light via a beam splitter 118. The beam splitter 118 may comprise any of a variety of devices readily available to those skilled in the art. The photodetector sensor 116 is responsive to the portion of the flash of light to provide a light signal indicative of the intensity of the portion of the flash of light received. Suitable photodetector sensors 116 are readily available commercially.

The data processor 108 is responsive to the light signal received from the photodetector sensor 116 for altering the image signal to compensate the image signal for variations in the intensity of the flash of light provided by the strobe unit 114. In accordance with a particular feature of the present invention, the data processor 108 provides the scan signal to the motion controller 106 so that a plurality of image signals may be obtained without waiting for relative motion in the motion controller 106 or camera 102 to stop. Since the flash of light provided by the strobe assembly only illuminates the specimen for an instant, the motion of the motion controller 106 is substantially frozen and, therefore, will not have any substantial effect on the focus of the image signal provided by the camera assembly 102.

Further, as will be discussed below, the data processor 108 is capable of controlling the camera system 100 so that image signals may be obtained immediately after the motion controller 106 positions the slide 104 in response to the scan signal from the data processor. After the motion controller 106 has moved the slide into position, the motion controller stops moving, leaving only vibration. As discussed herein, the data processor 108 is capable of determining the exact displacement necessary to bring an image into focus.

Figure 3:
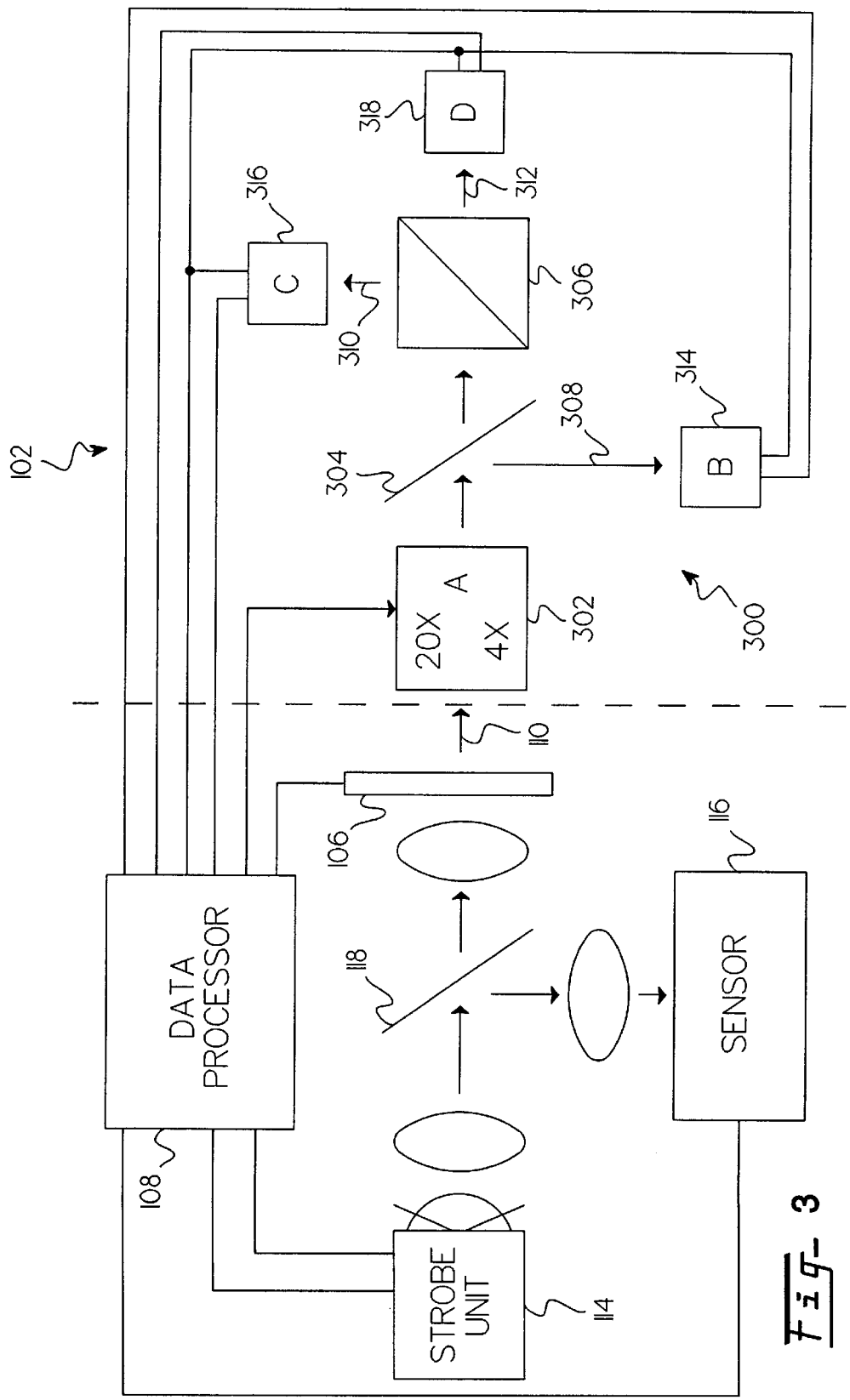
FIG. 3 is a more detailed illustrative diagram of the camera assembly that comprises the subject invention.

A more detailed diagram of the camera assembly 102 is provided in the illustrative diagram of FIG. 3. Therein, an optical transmission assembly 300 includes an objective lens assembly 302, a first beam splitter 304 and a second beam splitter 306. The first and second beam splitters 304 and 306 provide first, second, and third optical paths 308, 310, and 312, respectively. The objective lens assembly 302 is constructed to vary the magnification provided to the specimen on the slide 104. In a presently preferred embodiment of the invention, the objective lens assembly 302 is responsive to a magnification signal received from the data processor 108 to select various lenses to vary the magnification. Suitable assemblies for responding to an electric signal to move two or more lenses into and out of position for varying the magnification provided to the specimen may readily be provided by those skilled in the art.

A primary camera 314 is positioned to receive a first image of the specimen on the slide 104 via the first optical path 308. The first optical path 308 is the path from point A on the objective 302 to point B at the CCD of the primary camera 314. The primary camera 314 is responsive to an activation signal for providing an image signal representing the first image. A focus plus camera 316 is positioned to receive a second image of the specimen on the slide 104 along a second optical path 310. The second optical path 310 is the path from point A on the objective 302 to point C on the CCD of the focus plus camera 318. As discussed above by reference to FIGS. 1 and 2, the length of the second optical path 310 is less than the length of the first optical path by a predetermined length. The focus plus camera 316 is also responsive to the activation signal for providing a focus plus signal, wherein the focus plus signal is indicative of the focus of the image signal. A focus minus camera 318 is positioned to receive a third image of the object on the slide 104 via a third optical path 312. The third optical path is the path from point A on the objective 302 to a point D on the CCD of the focus minus camera 318. The length of the third optical path 312 is greater than the length of the first optical path 308 by the predetermined length. The focus minus camera 318 is responsive to the activation signal for providing a focus minus signal that is also indicative of the focus of the image signal.

Figure 4:
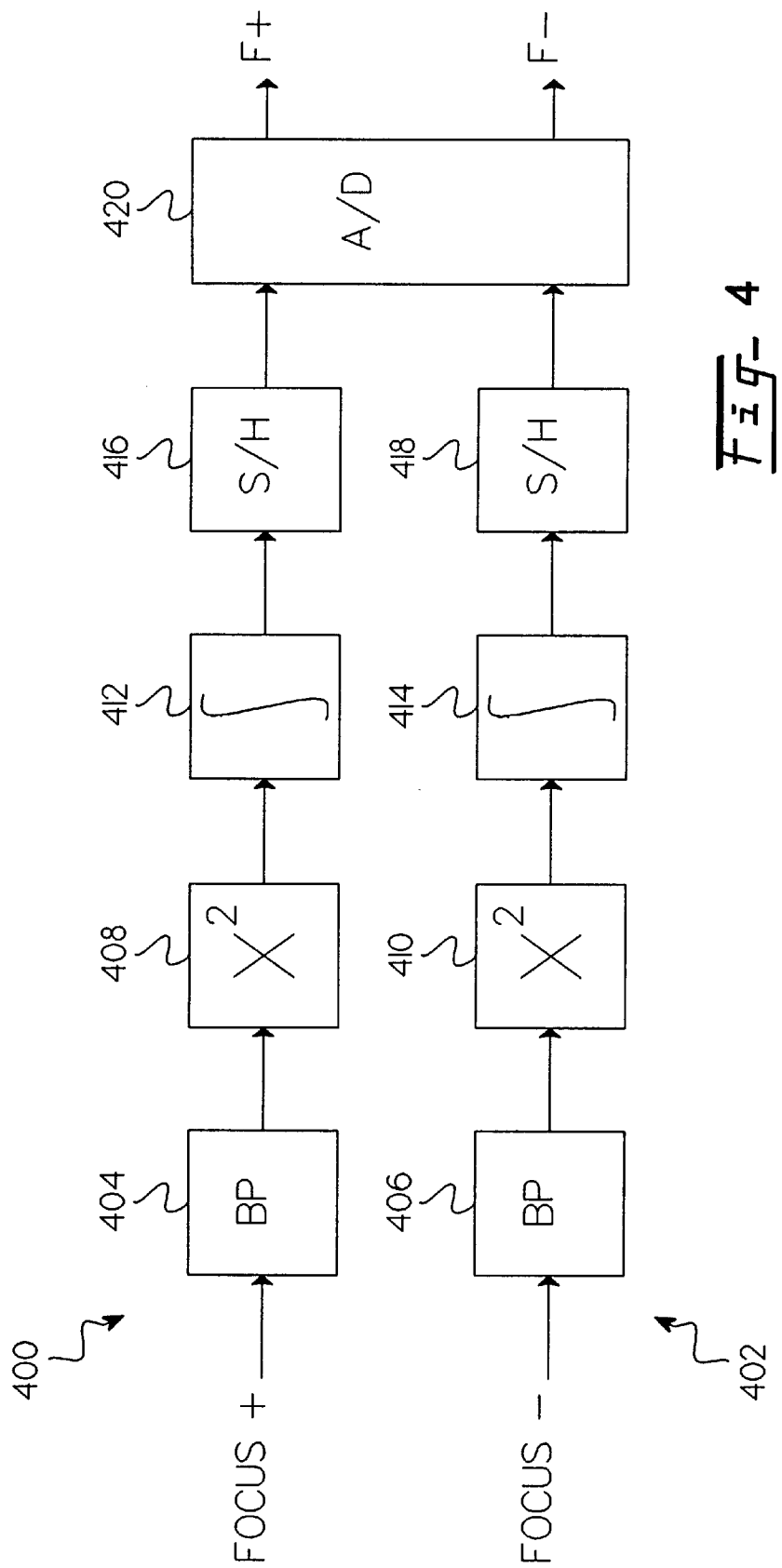
FIG. 4 is an illustrative diagram of a circuit for determining the focus position of the camera assembly of FIG. 3.

As discussed above, the data processor 108 determines the band-pass energy of the focus plus signal and the focus minus signal to determine the proper positioning of the slide 104 so that the image signals will be representative of a focused image of the specimen on the slide. Accordingly, the data processor 108 includes first and second identical focus processor circuits 400 and 402, as illustrated in FIG. 4. The focus processor circuits 400 and 402 each include a band pass filter 404 and 406, respectively, for receiving the focus plus and focus minus signals. The band pass filters 404 and 406 are constructed to pass a band-pass energy component of the focus plus and focus minus signals. Each filtered signal is multiplied by itself in respective multiplier circuits 408 and 410 so that the resulting signal is always proportional to the magnitude of the energy. This energy level signal is then integrated for each line of active video provided in respective integrators 412 and 414 to provide signals indicative of the total energy provided in the bandpass. The output from integrators 412 and 414 is sampled by respective sample and hold circuits 416 and 418 before being digitized by an analog-to-digital convertor 420. The data processor 108 uses the signals from the analog-to-digital convertor 420 to determine the proper positioning of the slide 104 so that the image signals provided by the primary camera 314 will be representative of a focused image.

The correction unit 502 of the data processor 108 is provided for correcting the image signal for pixel-to-pixel variation in amplification and leakage current. A presently preferred circuit for the correction unit 502 is shown and described in co-pending U.S. application Ser. No. 07/838, 065 entitled "Method And Apparatus For Dynamic Correction Of Image Signals", by Jon W. Hayenga, et al., filed Feb. 18, 1992.

Figure 5:
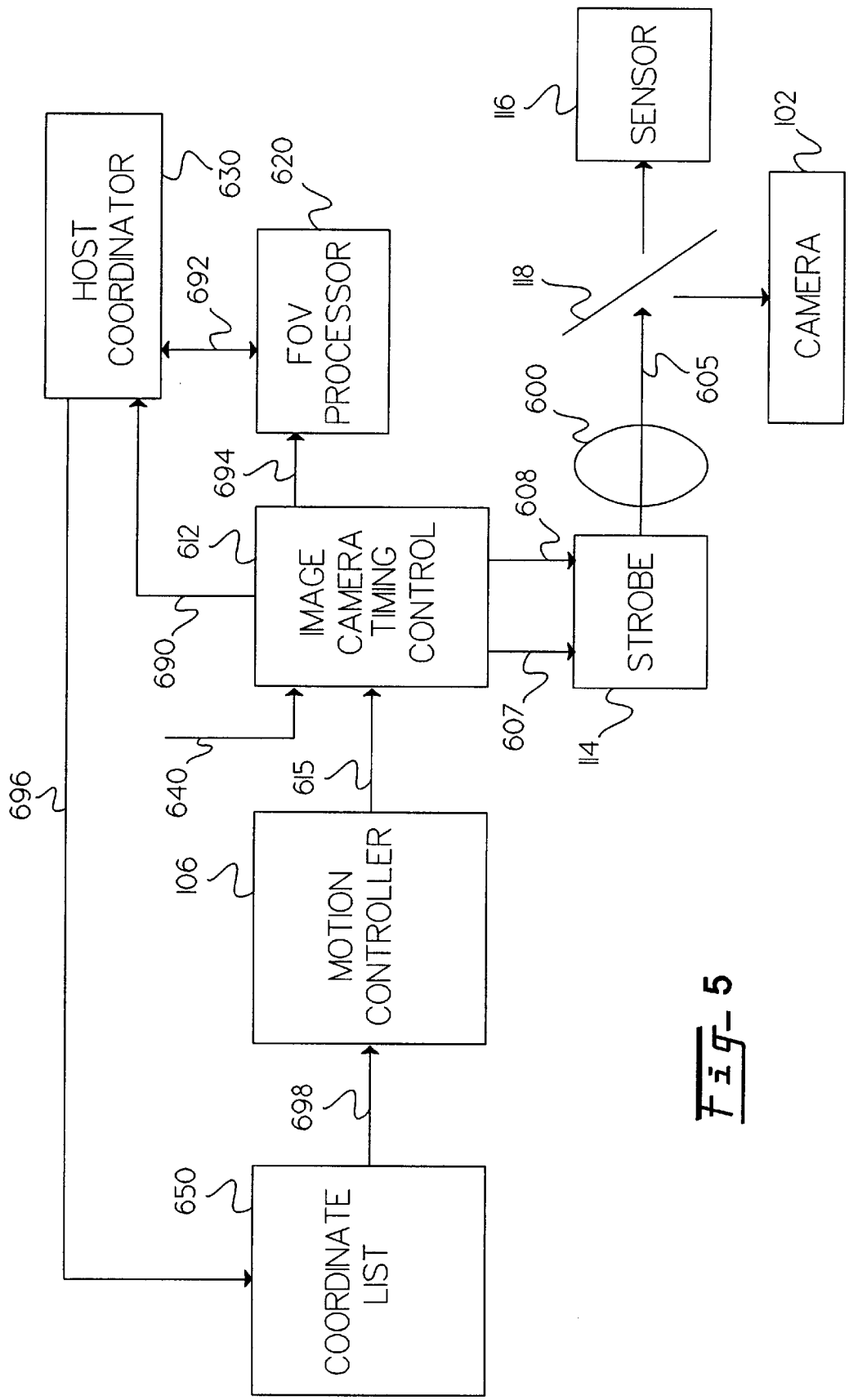
FIG. 5 is a more detailed block diagram of an apparatus for calibrating the camera system and for performing a flash-to-flash correction on the intensity of light emitted from the strobe.

Now referring to FIG. 5, a more detailed block diagram of an apparatus for calibrating camera system 100 and for performing a flash-to-flash correction on the intensity of light emitted from strobe unit 114 is shown. In one embodiment of the invention, the apparatus includes an image timing control 612, FOV processor 620, a host coordinator 630 and a coordinate list 650. The image timing control 612, FOV processor 620, host coordinator 630 and coordinate list 650 may advantageously be integrally incorporated into processor 108.

An optical density wheel 600 is positioned in the path of light beam 605 emitted from strobe unit 114 to sensor 616. Optical wheel 600 is adjusted until the output from the camera is at a suitable camera voltage in which a running average sensor value can be determined. The camera output is set up to maximize dynamic range according to manufacturers specifications. Once a suitable camera voltage is obtained, the sensor 116 stores the running average sensor value. In this manner, flash-to-flash correction of the strobe unit 114 intensity is performed for each and every image obtained by the camera. Light beam 605 emitted from strobe 114 is further deflected to lens assembly 602 of camera assembly 102, by beam splitter 118, as discussed above.

Image camera and timing control 612 receives camera analog image data 640. The image camera and timing control 612 provides an intensity control signal on line 607 to strobe unit 114. The image camera and timing control 612 further provides a flash signal to strobe unit 114 via line 608. A digital image is sent on line 694 to field-of-view (FOV) processor 620 from image camera and timing control 612. Host coordinator 630 determines whether the image is in focus using focus score information on line 690. If the image received is not in focus, an abort signal is sent on line 692 from host coordinator 630 to FOV processor 620, and the image signal will not be processed.

Coordinate list 650 stores an index of x, y and z positions. The list is sorted and prioritized based, for example, on relative proximity to other FOV coordinates. Host coordinator 630 communicates with the coordinate list 650 via line 696 and controls the coordinate list 650 to produce and send a new set of coordinates x, y, z to motion controller 606 on line 698. In one example embodiment of the invention, this indication is made 60 ms, or 1.5 complete image frames, before the motion controller 606 actually arrives at the new coordinate. Though 60 ms notice is given, the motion controller 606 only requires 40 ms to arrive at new coordinates. Motion controller 606 processes the list in the order received by coordinate list 650 and sends a scan synchronization signal 615 to image camera and timing control 612. The host coordinator 630 receives an image focus score, calculated in the manner described above. If the image is not in focus, the host coordinator 630 sends a signal to coordinate list 650 indicating that the set of coordinates was unfocused. The host coordinator 630 saves focus information in vector format, which is used upon returning to an unfocused coordinate x, y, z position.

Figure 6:
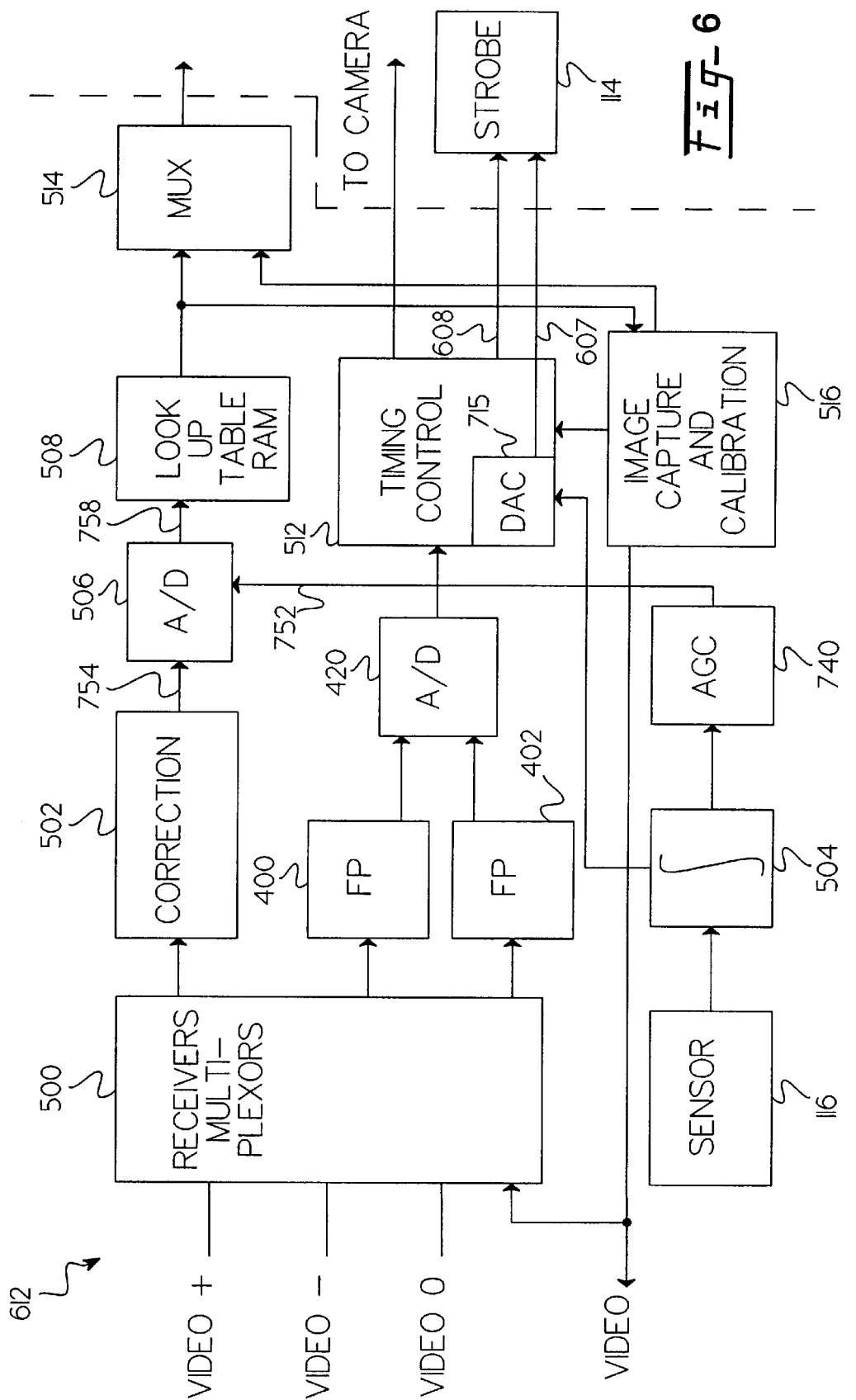
FIG. 6 is a more detailed illustrative block diagram of an image camera timing control.

Now referring to FIG. 6 a more detailed illustrative block diagram of an image camera timing control is shown. The image camera timing control 612 includes a receiver/multiplexer 500 for receiving the image signal, focus plus signal, and focus minus signal. The receiver/multiplexer 500 is constructed to couple the image signal to a correction unit 502 for correcting the image signal for pixel-to-pixel variation, as will be described in more detail below. The receiver/multiplexer 500 further couples the focus plus and focus minus signals to focus processor circuits 400 and 402, discussed above. The light signal from the sensor 116 is coupled to an energy detector 504 for determining the energy provided by the flash of light from the strobe unit 114 and providing an energy signal indicative of its magnitude. The energy signal from the energy detector 504 is coupled to the reference input of an analog-to-digital converter 506. The analog-to-digital convertor 506 is also coupled to receive image signals from the correction unit 502 and to provide digital signals indicative of their magnitude by coupling the energy signals from the energy detector 504 to the reference input of the analog-to-digital convertor 506, the digital output will be automatically corrected for variation in the intensity of the flash of light provided by the strobe unit 114.

The digitized image signals from the analog-to-digital convertor 506 are provided to a memory unit 508. The memory unit 508 may comprise random access memory or any other memory for providing a conversion to the digitized image signals. The output from the random access memory 508 is selected by a multiplexer 514 as the output of the data processor 108. As illustrated, the multiplexer selects the video signal from the random access memory 508 and predetermined video signals from a calibration unit 516. The calibration signals are used to determine the proper calibration of the data processor 108 for calibrating the video signal from the camera.

A timing control circuit 512 controls the timing of the activation signals and the pulse and intensity signals. In accordance with a particularly novel aspect of the subject invention, a primary camera 314, capable of asynchronous operations, is selected so that the data processor 108 may control the time that the image signals are obtained, without waiting for the camera to be in synchronization with the motion controller 106. In operation, the motion controller 106 provides the position signal to the data processor 108 prior to the time that the motion controller 106 will position the slide 104 in the position designated by the scan signal. The data processor 108 responds to the position signal to provide the activation signal to the primary camera 314, thereby synchronizing the primary camera 314 so that it will obtain an image when the motion controller arrives at the position designated by the scan signal. Thereafter, the data processor 108 provides the intensity and pulse signals to the strobe unit 114 to illuminate the slide 104 at the time the motion controller 106 positions the slide at the designated position and the primary camera 314 begins obtaining the image signals.

The running average sensor value, discussed in relation to FIG. 5 above, is stored in timing control circuit 512. In order to compensate for long term drift of the strobe lamp, a running average of between 100 and 200 flashes is maintained in a moving window. Each time a flash occurs, a value falls off the end of the queue and the running average sensor intensity value is recalculated. If the running average drifts, a correction may be made through timing control circuit 512. Once an average sensor value is obtained, it becomes a reference sensor value. If the average sensor value is a too high, timing control circuit 512 provides a corrective intensity control signal on line 607 to turn down the intensity.

Sensor 116 is positioned to receive a light beam 605 from strobe unit 114. In response to light beam 605, sensor 616 sends a signal to integrator 504. Following integration, average gain controller (AGC) 740 adjusts the gain so that it outputs a reference signal of about 2 volts to analog-to-digital (A/D) converter 506 along reference line 752. The AGC 740 operates to maintain an average of 2 volts. However, the flash-to-flash variations in the strobe lamp are still applied to the A/D converter 506. A/D converter 750 may advantageously include a video input 754 as well as a 0–255 output 758.

Output from integrator amp 504 is also received by timing control circuit 512. Timing control circuit 512 maintains a running average intensity value and controls a digital-to-analog converter (DAC) 715 which in turn provides a signal to strobe unit 114. In this way, the output from DAC 715 provides strobe maintenance including slow drift control of the illumination based upon the running average intensity value.

In a presently preferred embodiment of the invention, the motion controller 106 provides the position signal 61 milliseconds prior to the time it positions the slide at the designated position. The data processor 108 sets the timing to the primary camera 21 milliseconds prior to the time the motion controller positions the slide at the designated position and the intensity and pulse signals are provided to the strobe assembly 112 at the time the motion controller positions the slide at the designated position. The data processor 108 may further include a microprocessor, or other type processing device, for executing a predetermined set of instructions to perform a desired function. A particularly novel aspect of the subject invention is the method by which the focus plus and focus minus signals are combined to determine the proper focus of the camera.

In operation, the data processor 108 receives an array of focus plus scores FP(0), FP(1), . . . FP(255), and array of focus minus scores FM(0), FM(1), . . . FM(225), each including 256 elements, one for each line of a particular field of the camera 102. The focus plus and focus minus arrays provide video signals to the focus processor which are used to calculate the focus score. Only the first field of the interlaced video image is used to calculate the focus score so that the acceptability of the image may be determined while the second field is still being received from the camera. In this manner, the focus score is available before the entire image is received. Each line of the image is processed through bandpass filters and the energy is integrated and measured by the analog-to-digital converters.

Figure 9:
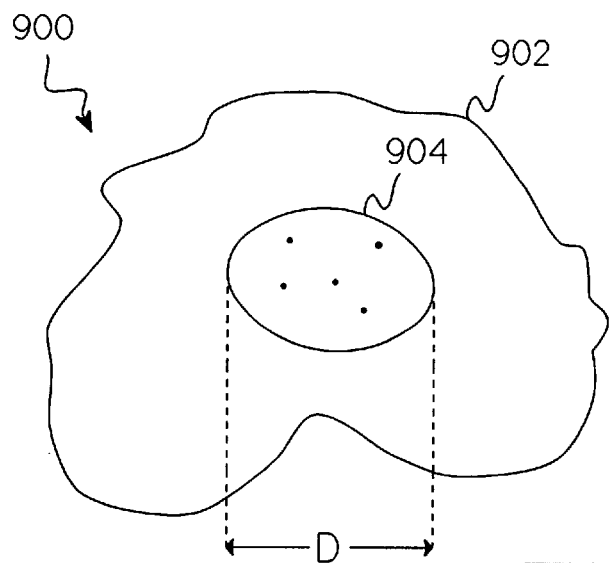
FIG. 9 shows a schematic view of a typical cell.

In order to further understand the filter selection process of the invention, refer to FIG. 9 where a schematic view of a typical cell is shown. A cell 900 comprises cell cytoplasm 902 and a cell nucleus 904. Typical cell nuclear sizes for pap smears range in area from about 40 micrometers squared to 220 micrometers squared. Typical nuclear diameters range from about 4 micrometers to 10 micrometers. In one example embodiment of the invention where the magnification of interest is 20×, pixel size is 0.55 micrometers per pixel.

Figure 10:
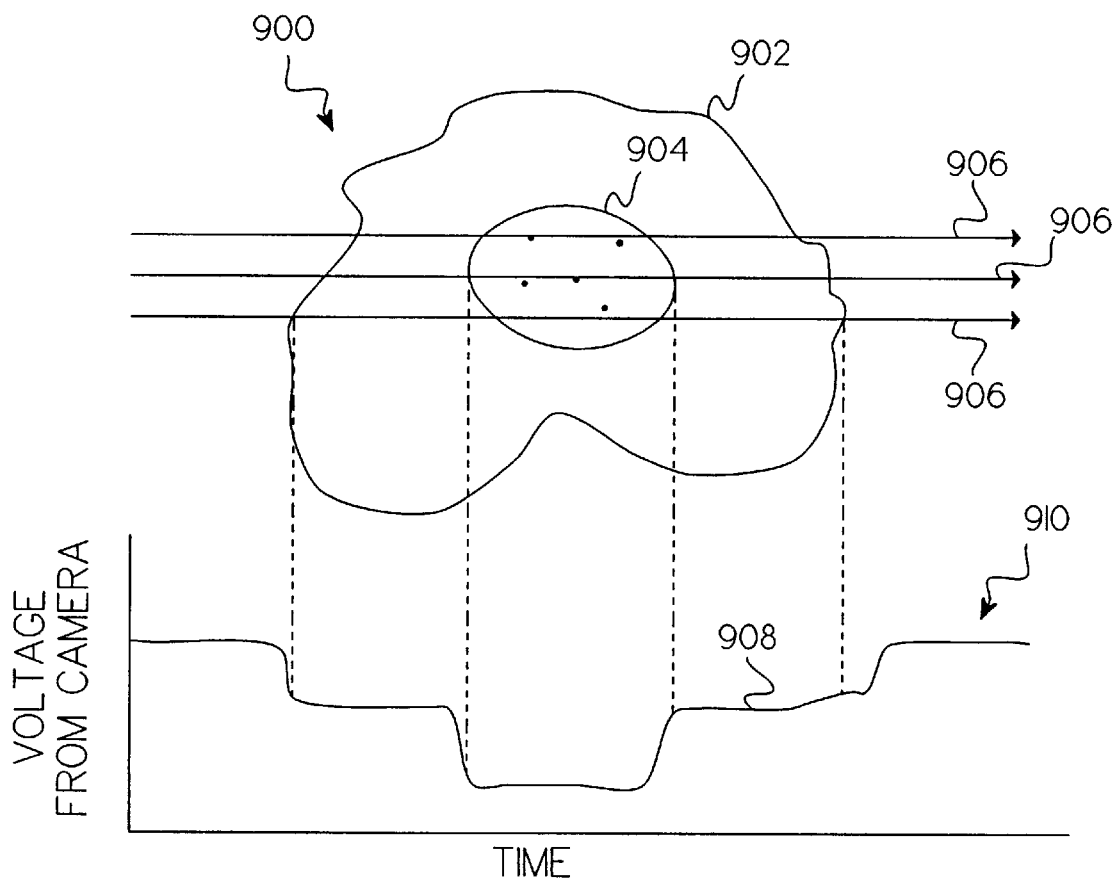
FIG. 10 shows a process for converting physical cell size into electrical band width.

Now referring to FIG. 10, a process for converting physical cell size into electrical band width is schematically illustrated. The conversion from physical size into electrical band width may be accomplished by using the known pixel clock rate from the camera. In this example, the pixel clock rate is $14.1875 \times 10^6$ pixels per second. From the pixel clock rate, the physical size of a cell nucleus may be translated into a time varying voltage when the camera images the cell nucleus. This technique is well known in the art. The pixel time in one example of the invention is about $70.5 \times 10^{-9}$ seconds. The target for the focus system is between 7 and 19 pixels in size. Because some spreading of the object size occurs due to defocused images being used as the stimulus to the cameras for measuring focus, the size range is increased slightly. The focus system may advantageously be made sensitive to objects having a size of from 7 to 22 pixels. A nucleus sectioned by a video camera scan line 906 has a time varying modulation 908 in the electrical domain, which correlates to its size in the spatial domain. The relationship between the spatial domain and electrical domain is illustrated in FIG. 10 which shows the cell 900 having its nucleus 904 scanned by video lines 906. The scanned cell is then translated into electrical voltages as indicated by plot 910 which plots a modulated voltage signal 908 against time.

Figure 11:
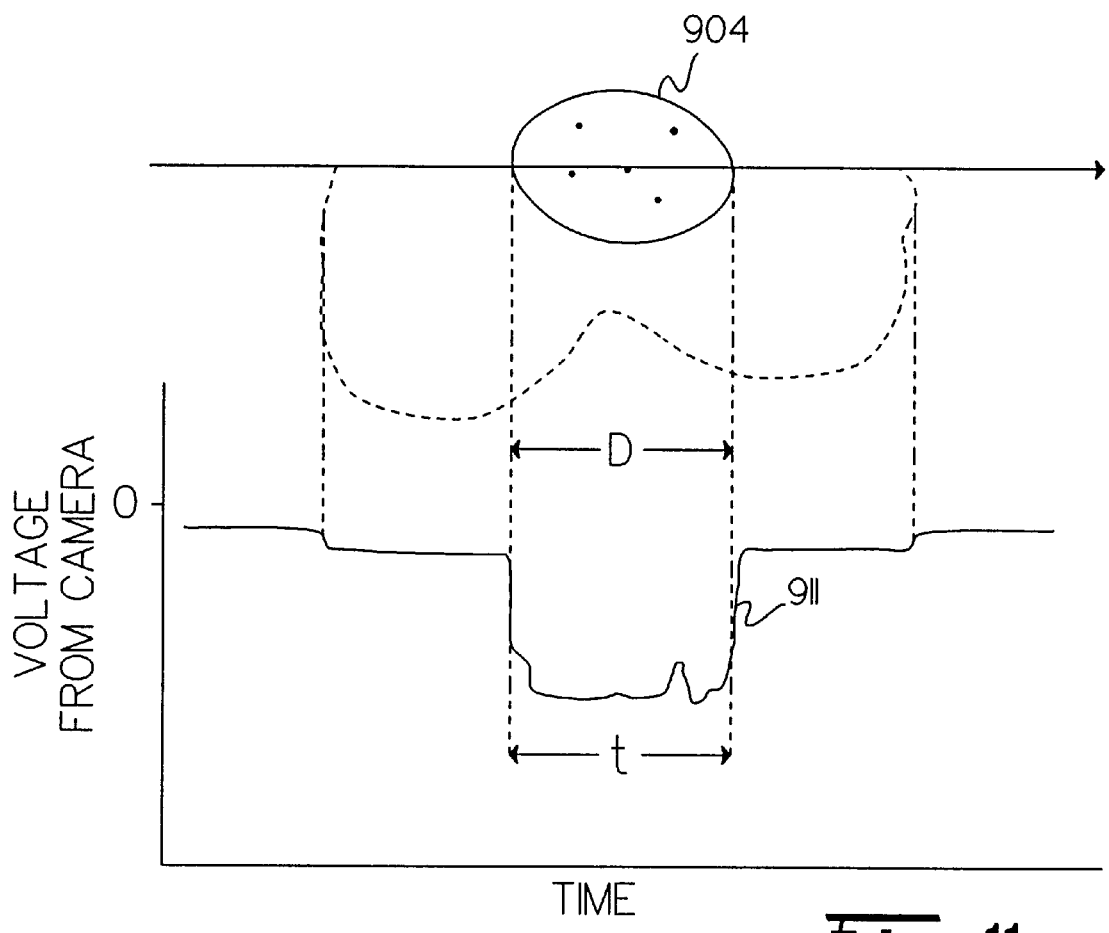
FIG. 11 graphically illustrates a time vary voltage of a dark nucleus.
Figure 12:
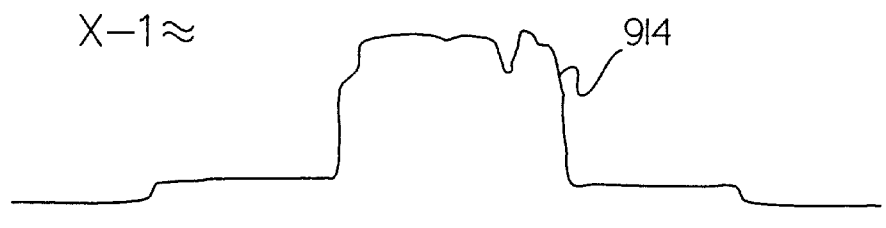
FIG. 12 shows an inverted pulse representing a square function.

Referring now to FIG. 11, a time vary voltage of a dark nucleus is graphically illustrated. The nucleus 904 is analogous to a pulse or square function 912 having an interval,t. In this example, shown for illustrative purposes and not by way of limitation of the invention, the interval t may range from about $493 \times 10^{-9}$ to $1550 \times 10^{-9}$ seconds. FIG. 12 shows an inverted pulse 914 which is inversely related to pulse 911. Fourier transformations for such square functions are well known.

Figure 13:
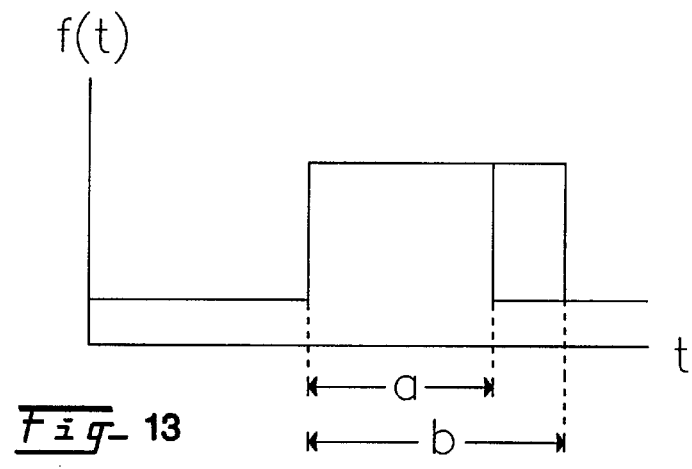
FIGS. 13 and 14 show a Fourier transformation for a square function as employed in one aspect of the invention.
Figure 14:
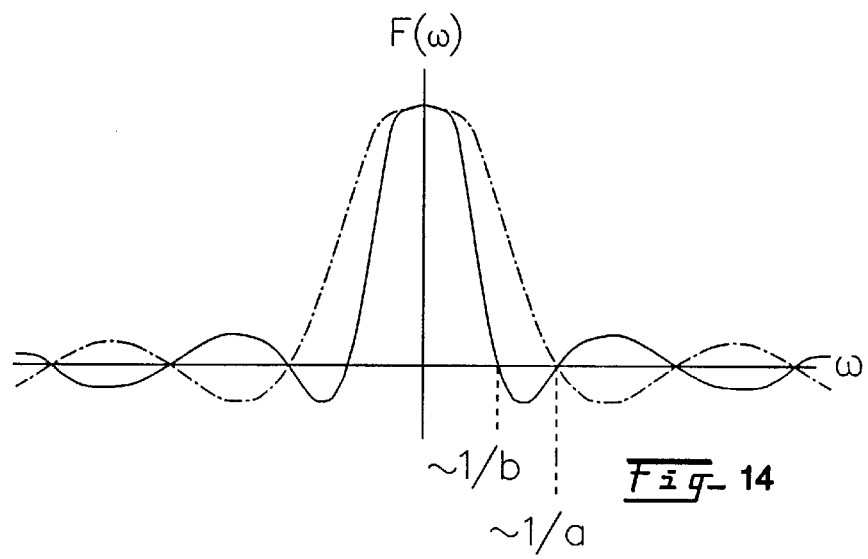

Referring now jointly to FIGS. 13 and 14, a Fourier transformation for a square function is illustrated as employed in one aspect of the invention. Where a is the smallest nucleus and b is the biggest nucleus, the focus transformation of such pulses then represent spectral energy of objects of the particular size of interest. Using the Fourier representation of these objects, a spectral filter may be chosen which is sensitive to objects in this size range.

Figure 15:
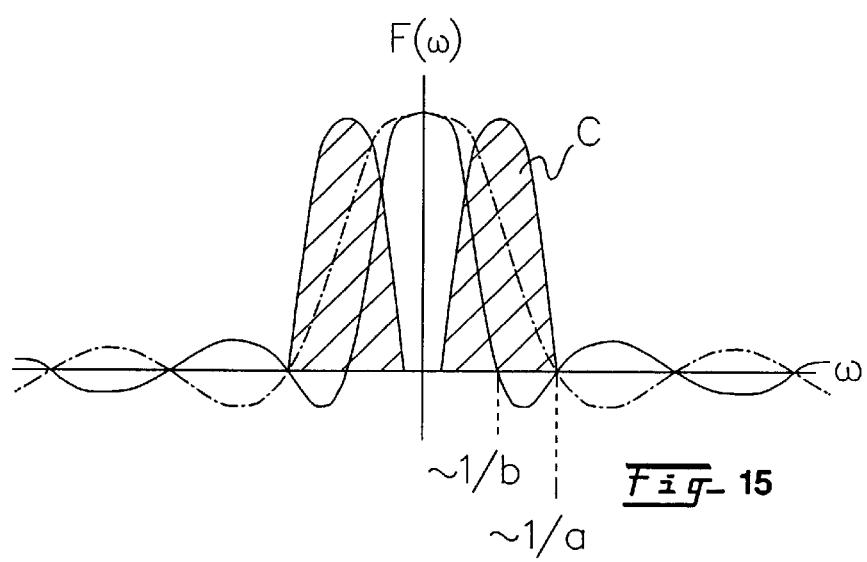
FIG. 15 illustrates a filter response sensitive to objects of interest, such as cell nuclei as employed in one embodiment of the invention.

Referring now to FIG. 15, filter response sensitive to objects of interest, such as cell nuclei, is schematically illustrated. Filter response C may be selected so that the focus system is sensitive to cell nuclei in the size range of interest. Once having the benefit of knowing the filter response desired for objects in the range of interest as taught by the present invention, a band pass filter may then be designed using conventional techniques.

Next, a filter operation is performed on each of the four arrays FP, FM, FPnoise, and FMnoise in order to reduce sensitivity to objects that are smaller than the desired cells that are to be focused on. The filter operation is sensitive to the vertical size of objects, whereas the band pass filter on the video lines are sensitive to the horizontal size of objects. Accordingly, the system is sensitive to the two dimensional size of objects in the focus system. This provides an improved focus and improves signal-to-noise ratio.

The filter operation can be expressed as follows:
[FP(0) . . . FP(255)]*[Ffk(0) . . . Ffk(4)]→[XFPS(2) . . . XFPS(253)]
[FM(0) . . . FM(255)]* [Ffk(0) . . . Ffk(4)]→ [XFMS(2) . . . XFMS(253)]

The focus plus and focus minus array are each convolved with a filter array Ffk to correlate the energies of adjacent lines. The filter array Ffk is selected to provide a low pass filter that looks for objects at least five lines in size. The filter array Ffk is selected to provide a finite impulse response, low pass filtering of the focus plus and focus minus arrays. The filter kernel is designed to be sensitive to the size and type of object that the data processor 108 is attempting to detect. Further, the finite impulse response filtering is performed in a manner so that the resulting filter array eliminates the first and last few elements of the respective focus plus and focus minus array to eliminate edge effects from the filter.

After filtering the focus plus and focus minus arrays, filtered focus plus and focus minus arrays, XFPS and XFMS, respectively, are created with each array including 252 elements. The filtered focus scores are further combined with a noise array to eliminate noise that may be provided by the camera system 100. More particularly, the camera system 100 may include noise that results from camera noise, integrator leakage, dust or streaks on the focus camera, or in one of the optical image planes. To eliminate this noise, a noise array is generated and combined with the filtered focus scores. The noise array is generated by focusing the camera 102 upon a white field, i.e., one with no slide 104 so that the focus plus and focus minus camera can measure the fixed noise floor energy within the focus filter band pass. The blank image is viewed in order to obtain a measure of the fixed noise patterns that will stimulate the focus processor. The noise arrays of raw focus scores obtained from viewing the blank image are represented as: [FPnoise(0) . . . FPnoise(255)] for the focus plus array; and, [FMnoise(0) . . . FMnoise(255)] for the focus minus array. The noise floor integration is relatively consistent and can be measured and subtracted from the energy measurements made for the individual line scores. This significantly improves the signal to noise ratio for each line.

In this regard, a noise plus and noise minus array is measured for the focus plus and focus minus cameras 316, 318 in the same manner as the focus plus and focus minus signals, discussed above. The noise plus and noise minus arrays include an element for each line of the focus plus and focus minus arrays, respectively. The noise plus and noise minus arrays are convolved with the filter array Ffk, as discussed above with the focus plus and focus minus arrays, to provide filtered noise plus and filtered noise minus arrays, FPNX and FMNX, respectively. The resulting arrays are filtered noise plus and filtered noise minus arrays, having a one-to-one correspondence with the focus plus and focus minus arrays, respectively. The filter operation on the noise arrays are expressed as follows:

[FPnoise(0) . . . FPnoise(255)]* [Ffk(0) . . . Ffk(4)]⇒[FPNX(2) . . . FPNX(253)]
[FMnoise(0) . . . FMnoise(255)]* [Ffk(0) . . . Ffk(4)]⇒[FMNX(2) . . . FMNX(253)]

The filter operations are a convolution, shown in the above equations by the asterisk symbol. The 2 elements on each end of the filtered arrays are excluded since the convolution operation is not defined for the elements on each end of the array. The filtered noise plus and noise minus arrays, FPNX and FMNX are correspondingly subtracted from the filtered focus plus and focus minus arrays, XFPS and XFMS, to provide respective focus plus and focus minus signal arrays, FPS and FMS. This improves the S/N ratio. The noise value can be as much as 10%–50% of the total signal. Since the noise is static and repeatable, it can be removed with this method. The noise reduced arrays are as follows:

[XFPS(2) . . . XFPS(253)]−[FPNX(2) . . . FPNX(253)]= FPS[(2) . . . (253)]
[XFMS(2) . . . XFMS(253)]−[FMNX(2) . . . FMNX(253)]=FMS[(2) . . . (253)]

The individual elements of the focus plus signal and the focus minus signal arrays are now combined to provide an array of focus scores FS. Now, lines 2 through 253 have scores which are noise reduced and related to the two dimensional characteristics of above and below focus images. Each line from the above and below cameras represents a measure (in 2D) of the image frequency content. An array of focus scores can now be calculated as follows:

$$FS[(2)...(253)] = \frac{FPS[(\ )...(\ )] - FPM[(\ )...(\ )]}{FPS[(\ )...(\ )] + FPM[(\ )...(\ )]}$$

This step produces a normalized focus score for each line of the camera 102, except the first and last few lines that were excluded because of edge filter effects, as discussed above. Normalization of the focus scores helps to make the data independent, i.e., tends to make each score comparable to one another regardless of the amount of data used to produce the score. This operation normalizes the focus scores to values somewhere between −1 and +1, to create a spatially distributed set of focus scores.

After the focus plus signal array and focus minus signal array have been combined as discussed above to produce an array of focus scores, the array of focus scores is screened to eliminate those scores for which insufficient data existed to achieve a meaningful score. This is done by eliminating each score FS(x) for which FPS(x) plus FMS(x) is outside the range of a predetermined threshold. The threshold range is selected empirically by the lowest signal content image of interest. In a preferred embodiment of the invention, the range is selected to be between 3 and 240. Those skilled in the art will appreciate, however, that this range is only illustrative and that any range, including the full range, may be selected. In one embodiment, favorable results may be obtained using between 1% and 95% of the range. The FS values that qualify are then averaged to yield a single focus score evaluation for the image. This single focus score is a number between −1 and +1 which has a one-to-one correspondence with the distance necessary to move to put the image into best average focus.

In one aspect of the invention, a focus quality score, FQS(x), may be provided. The focus quality score comprises the average of FPS(x) plus FMS(x). The focus quality score indicates the signal level of the image and thereby provides a confidence level for the focus score. If the focus quality score is below a predetermined level, the focus score is not accepted as a reliable focus indicator.

After the focus score has been obtained a look up table is consulted for determining the distance and direction of movement along the optical path necessary to bring the object into focus. As noted above, a particularly novel aspect of the subject invention is the ability of the data processor 108 to not only determine whether an image is in focus or out of focus, and not only determine the direction necessary to move the specimen to bring the image into focus, but to also determine the distance of motion necessary to bring the specimen into focus. By determining the exact displacement, and direction of displacement, necessary to bring the specimen into focus, the data processor 108 may control the motion controller 106 to rapidly return to the position of any out of focus specimen and may provide the appropriate scan signal so that the motion controller will position the specimen to be in focus.

To determine the amount of displacement, a look up table comprising predetermined correction factors for a given set of optics is employed prior to obtaining any image signals. The correction factors may be derived empirically, for a each set of optics, using known methods. The correction factors in the look up table represent the distance necessary to move an object into focus. Since the focus scores relate to distance, the correction factors may be related to focus scores. When deriving the correction factors, a test image is employed and placed on the motion controller. In a presently preferred embodiment of the invention, a calibration to determine the displacement and direction correlation to focus scores is performed only once when the system is designed and remains the same so long as the component parts of the system are not disturbed. However, those skilled in the art will appreciate that the calibration to obtain data correlating the focus scores to the amount and direction of displacement may be performed at any time prior to obtaining image signals.

Using the above-described apparatus, focused image signals may be obtained in a very rapid manner. In a presently preferred embodiment of the invention, the motion controller 106 positions the slide 104 at a plurality of predetermined positions for obtaining image signals. After each image signal is obtained, the motion controller 106 immediately moves to obtain the next image signal. While the motion controller 106 is positioning the slide 104 to obtain the next image signal, the data processor 108 determines whether the last obtained image signal was in focus. Accordingly, there is a 60 millisecond delay between the time that the image is taken and the time the image is read out of the data processor 108. If the last obtained image was in focus, data processor 108 identifies the image signal as a focused image signal for use by the remainder of the system. However, if the image signal was not in focus, the data processor 108 determines the displacement and direction necessary for focus of the specimen. Thereafter, the data processor 108 instructs the motion controller 106 to return to the out of focus image and provides the necessary displacement information so that, when next obtained, the image will be in focus.

Those skilled in the art will appreciate that this method of obtaining focused image signals is much quicker than the prior art method where the specimen cannot be moved before a focused image signal is obtained. The present invention does not wait at the current coordinates for a focus score; rather, it proceeds to the next set of coordinates. This allows a subsequent image to be taken at new coordinates while the focus score for the image taken at the first coordinates is being processed. Even when the data processor 108 must return to obtain a second image signal because the first image signal was out of focus, the entire process may be performed in less time than that required by the prior art systems to obtain a single focused image signal. Further, since the camera assembly 102 may be advantageously constructed from asynchronous cameras, additional time is saved in obtaining focused image signals. Essentially, the only time delay for obtaining image signals is that necessary for the motion controller 106 to position the slide 104 and that necessary for the camera 102 to obtain the image signals.

Still further, as noted above, only a single field of the image signals need be used to determine focus. Since the even and odd field of image signals from the focus plus and focus minus cameras are interlaced, information from the odd field would be substantially duplicative of that obtained from the even field. Further, since the method of processing the focus plus and focus minus signals discussed above processes each line separately, prior to obtaining an overall focus score, the subject method provides much more information than that provided by prior art methods, even though using only one field. Still further, since each line is normalized, filtered, and corrected for noise, prior to obtaining the overall score, each line is capable of making a substantially equal contribution to the focus determination, even though the content of the image signal may vary from line to line. Accordingly, the proper focus position of the image in question is determined based primarily upon the even field of data. Thus, the focus is available before the odd field is fully read out from the camera. The above-noted method for processing the focus plus and focus minus signals results in faster and more accurate determination of focus than prior art systems.

The present invention makes use of an interlaced camera which reads every other line of the image in an even and odd field pattern. This process produces a complete sweep of the image and allows for the lines to be filled in at a later time. The even and odd fields each represent half of the image, even though both the even and odd fields are simultaneously exposed with a single flash of the light strobe. Each of the even and odd fields have a duration of approximately 20 ms.

Figure 7:
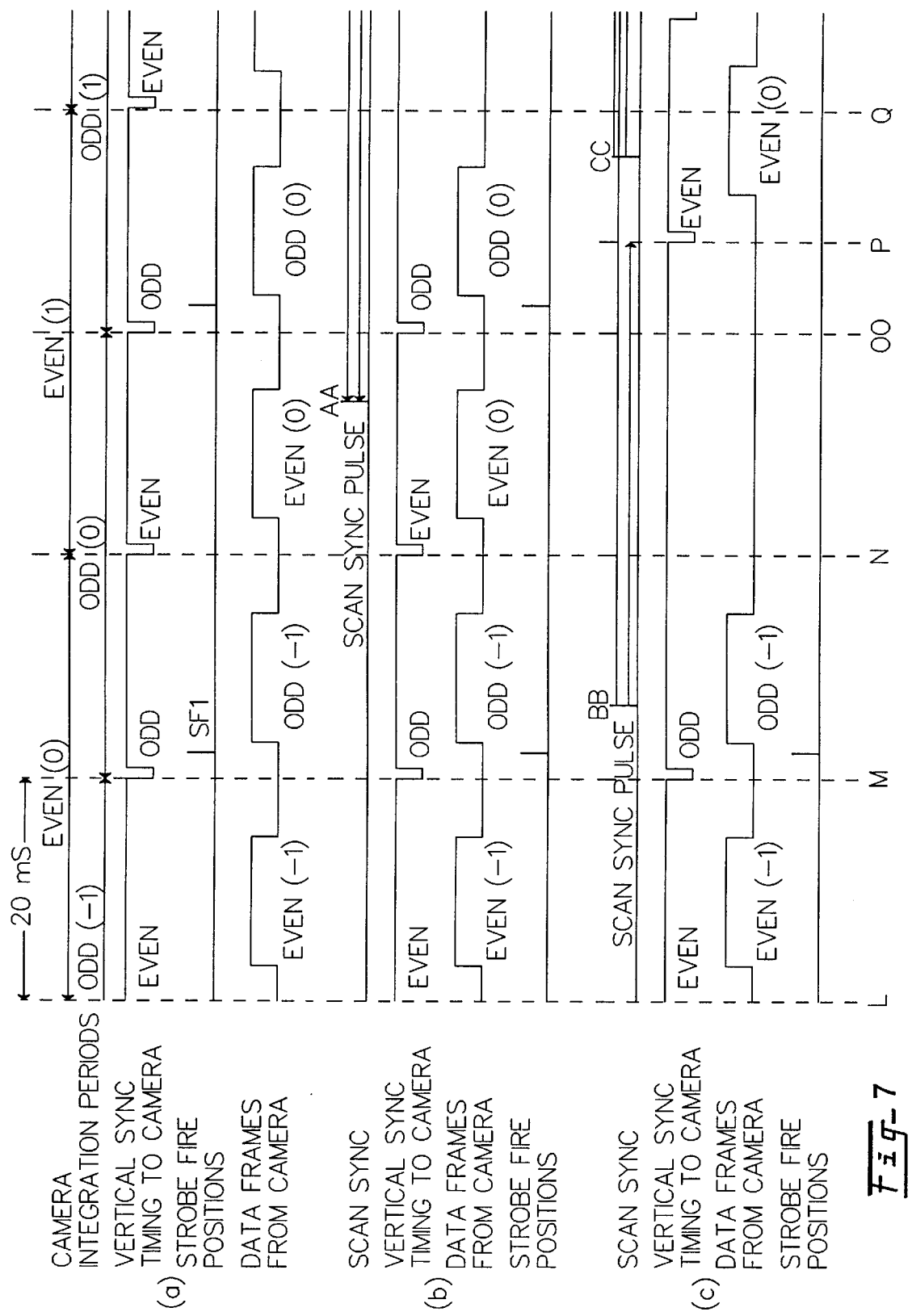
FIGS. 7 and 8 may be pieced together to show timing diagrams of the camera system.
Figure 8:
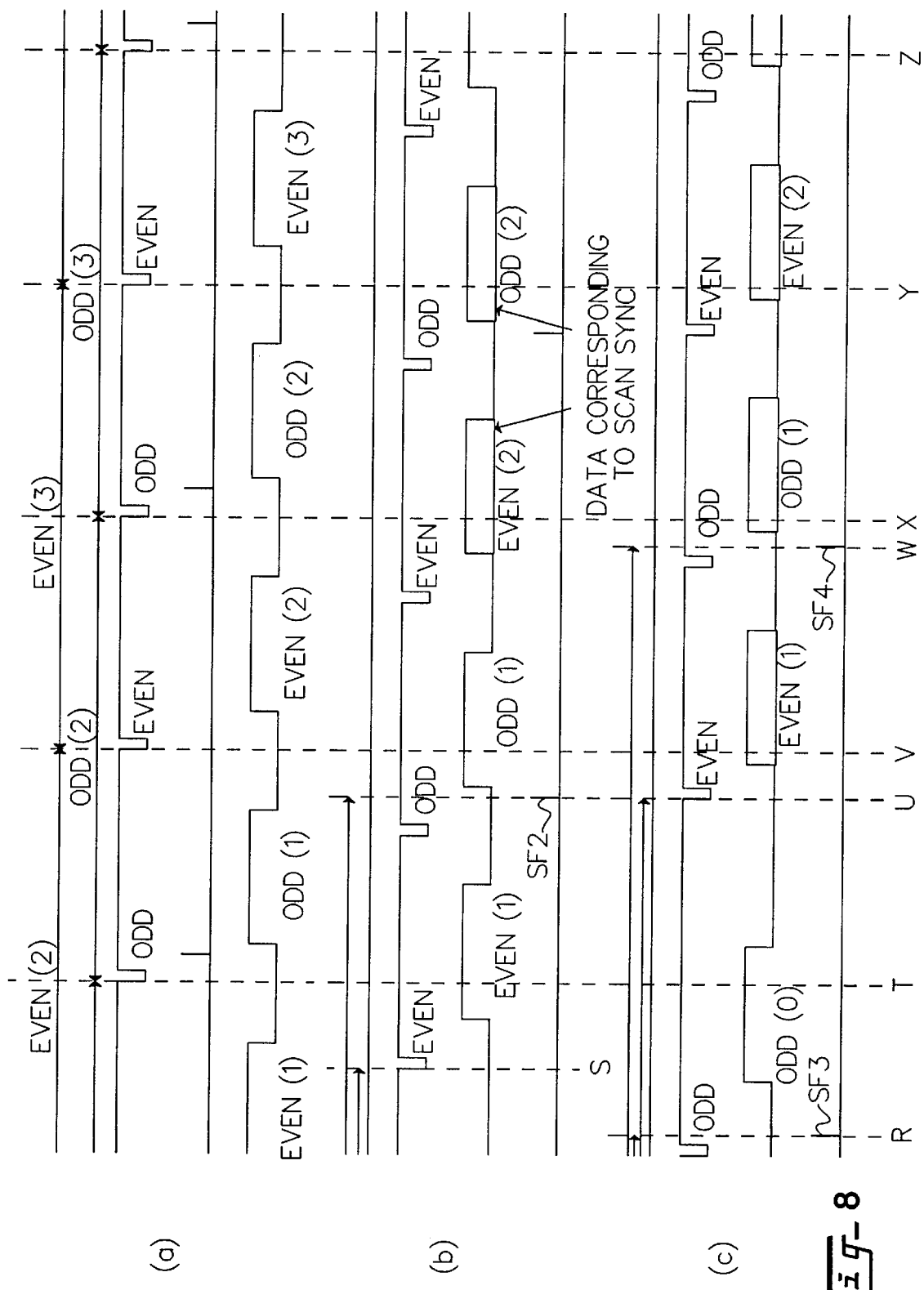

Now referring to FIGS. 7a, 7b, 7c, 8a, 8b, and 8c, vertically dashed lines L, M, N, OO, Q, R, T, V, X, Y and Z are spaced down the page in order to designate 20 millisecond intervals. In FIGS. 7a and 8a, timing charts are shown depicting use of the camera in operation without any scan synchronization pulses ("scan-syncs"). The first line in FIGS. 7a and 8a is called "Camera Integration Periods", which represent the amount of time that the camera integrates light for a particular field of data. The integration times comprise overlapping even and odd integration times, wherein each integration time has a 40 millisecond duration.

In the preferred embodiment, standard camera specifications allow a full image comprising both even and odd data frames to be made every 40 ms, that is, 25 frames per second. In addition, even and odd integration times coincide with signals received from data processor 108, shown as "Vertical Sync Timing to Camera" in FIGS. 7 and 8. The "Vertical Sync Timing to Camera" defines an even or odd field when high so that a new field begins after the signal goes low. The vertical sync goes low at every 20 ms interval and provides alternating odd and even syncs.

The next line in FIGS. 7a and 8a shows "Strobe Fire Positions", which are pulsed at optimal times or as suggested by the manufacturer of the camera. The next line of the timing charts shown in FIGS. 7a and 8a are the "Data Frames from Camera". The "Data Frames from Camera" represents even and odd information that is being read out from the camera.

Camera integration time even (0) begins at time L and ends at time N. Camera integration time odd (0) begins at time M and ends at time OO. A strobe fires some time during the even (0) integration time. In FIG. 7a, the strobe fires shortly after time M as indicated by pulse SF1, and the desired even and odd data is imaged. The data imaged during integration time even (0) are shown as even (0) and odd (0) data frames. The even (0) and odd (0) data are read out during the subsequent integration time, even (1). Thus, the camera is capable of taking an image every 40 ms.

FIGS. 7b and 8b show a single shot example of timing. A scan-sync pulse AA occurs during an even (1) integration time, shortly before time OO. The scan synchronization pulse AA is generated by motion controller 606 and transmitted to image camera and timing control 612 along signal line 615, as shown in FIG. 5. The scan synchronization AA indicates to image camera and timing control 612 that the motion controller will be positioned at new coordinates, obtained from coordinate list 650, in 60 ms. At the conclusion of 60 ms, or 1.5 complete image frames, image camera and timing control 612 sends a flash signal to strobe unit 114 along signal line 608.

Referring back to FIGS. 7b and 8b, the scan synchronization pulse AA occurs shortly before time OO. The next even data frame is expected to occur at time Q. However, in order for a full image to be taken, both even and odd data must be read. Scan synchronization pulses do not necessarily occur so that an even field will be present at the time the strobe lamp fires, that is, at the conclusion of 60 ms. In fact, pulse AA is shown to occur such that the even field of interest would have expired by the time the strobe fires. Thus, in order to read the even data of interest, the odd field vertical sync is extended 40 ms, and the even (1) data frame is delayed 40 ms. The even data is placed in a suitable position by having the even field vertical sync occur 40 ms from the scan sync. The fields are delayed by adding video lines to delay the start of the next even field of data.

The strobe fires at time U as indicated by pulse SF2, sometime between even data (1) and odd data (1) data frames from camera. The strobe exposes the picture for the desired image, and the camera images the specimen. Twenty (20) milliseconds after the flash, the data begins to read out from the camera. The data resulting from the strobe of interest, that corresponded to scan synchronization AA, is designated as even (2) and odd (2) data frames. Even (2) and odd (2) data form a complete video image of the desired specimen.

FIGS. 7c and 8c are timing diagrams showing two scan synchronization pulses, BB and CC, 50 ms apart. The first scan synchronization pulse BB occurs between time intervals M and N. The second scan synchronization pulse CC occurs between time intervals OO and Q. The second scan synchronization pulse CC occurs 50 ms after the first scan synchronization pulse BB. The maximum video rate allowed by the camera is an image every 40 ms, so that the maximum rate would be achieved by sending scan syncs every 40 ms. However, for illustrative purposes, the two scan syncs of FIGS. 7c and 8c were chosen to be 50 ms apart. Each scan synchronization BB, CC is sent 60 ms (1.5 complete image frames) prior to the occurrence of a corresponding strobe fire, shown as SF3 and SF4 at time intervals R and W, respectively.

Following the occurrence of the first scan synchronization BB, the even (0) field is delayed to start 40 ms from the first scan synchronization BB, at time interval P. Fifty milliseconds (50 ms) after the first scan synchronization BB, a second scan synchronization CC occurs. Sixty milliseconds (60 ms) after the first scan synchronization BB, a first strobe fires SF3 at time interval R and the first image is exposed. The even (1) data is delayed to occur 40 ms after the second scan synchronization CC, at time interval U. The even (1) data and odd (1) provide a complete image obtained from the first strobe fire SF3 that was announced by the first scan synchronization BB. The even (1) data starts to come out of the camera shortly before time interval V. The second strobe SF4 fires at time interval W and the odd (1) data starts to read out of the camera shortly before time interval X. A focus distance is known for the first image shortly after the odd (1) data starts to come out from the camera. The even (2) data and odd (2) provide a complete image obtained from the second strobe fire that was announced by the second scan synchronization CC. The even (2) starts to come out of the camera shortly before time interval Y, 40 ms after the even (1) data. The odd (2) data starts to read out of the camera shortly before time interval Z, 40 ms after the odd (1) data.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for rapid capture of focused microscopic images on a slide in a system using a camera for providing interlaced images at a predetermined video rate, the method comprising the steps of:

(a) providing a first scan synchronization pulse at a first time;

(b) providing a second scan synchronization pulse at a second time;

(c) moving the camera to a first predetermined position within a first predetermined time interval in response to the first scan synchronization pulse where the first predetermined time interval is initiated by the first scan synchronization pulse;

(d) illuminating a strobe after the first predetermined time interval has elapsed so as to obtain a first interlaced image;

(e) moving the camera to a second predetermined position within a second predetermined time interval in response to the second scan synchronization pulse where the second predetermined time interval is initiated by the second scan synchronization pulse; and (f) firing the strobe after the second predetermined time interval has elapsed so as to obtain a second interlaced image where the first predetermined time interval and second predetermined time interval are selected so as to illuminate the strobe at the second predetermined position before the first interlaced image has been read out of the camera.

2. The method as recited in claim 1 wherein the first predetermined time interval has a duration greater than or equal to a predetermined frame time.

3. The method as recited in claim 1 wherein the second predetermined time interval has a duration greater than or equal to a predetermined frame time.

4. The method as recited in claim 1 further comprising the step of providing a coordinate list for deriving the first predetermined position and the second predetermined position.

5. The method as recited in claim 1 wherein the first time and the second time bound an interval proportional to a maximum video rate allowed by the camera.

6. The method as recited in claim 1 wherein steps (a) through (f) are repeated continuously so as to capture images of a plurality of fields of view on a microscope slide.

7. The method as recited in claim 1 further comprising the step of processing a focus score for each captured image, wherein the camera is moved to a subsequent position for capturing an image while a focus score for a previous image is being processed.

8. The method as recited in claim 7 further comprising the step of processing a focus quality score for each captured image, where the focus score is defined by a —focus-plus— signal array plus a —focus-minus—signal array and the focus quality score comprises the average of the focus plus signal array and a focus minus signal array and the focus quality score indicates the signal level of the image and thereby provides a confidence level for the focus score.

9. An apparatus for providing digital data representing an image of a specimen on a slide, said apparatus comprising:

(a) a linear motion controller including a stage for receiving the slide, said linear motion controller being coupled to a slide scan signal, the linear motion controller responding to the slide scan signal so as to move said stage in a slide plane represented by X and Y directions, said linear motion controller being further coupled to a slide focus signal, the linear motion controller responding to the slide focus signal so as to move said stage in a direction normal to said slide plane, said linear motion controller further including an output providing a position signal indicating the X, Y, and Z position of said stage;

(b) a strobe coupled to a pulse signal, the strobe responding to the pulse signal so as to provide a flash of light, said strobe being further coupled to an intensity signal, wherein the strobe responds to the intensity signal so as to vary intensity of the flash of light provided, said strobe being positioned to illuminate the slide with the flash of light;

(c) photo detector means, positioned to receive a portion of said flash of light, for providing a light signal indicative of the intensity of said flash of light;

(d) optical transmission means for providing first, second, and third images of the slide along a first optical path, a second optical path, and a third optical path, said optical transmission means further including a means for varying the magnification provided to said first image, second image, and third image of the slide so as to produce a first magnified image, a second magnified image and a third magnified image, said optical transmission means being positioned relative to said stage of said linear motion controller so that said slide focus signal moves said stage to vary the focal length between the slide and said optical transmission means;

(e) primary camera means, positioned along said first optical path for receiving said first image of the slide from said optical transmission means, for receiving the first magnified image provided by said optical transmission means, said primary camera means being coupled to an activation signal, wherein said primary camera means includes means for providing an image signal representing the first magnified image in response to said activation signal, where the means for providing an image signal includes a video output for images and, wherein said pulse signal is timed so as to repeat at predetermined intervals so as to allow capture of a subsequent image prior to completion of video output of a previous image;

(f) first focus camera means, positioned along said second optical path for receiving said second image of the slide from said optical transmission means wherein the length of said second optical path is greater than the length of said first optical path by a predetermined length, said first focus camera means being coupled to said activation signal, for providing a focus-plus signal indicative of the focus of said image signal;

(g) second focus camera means, positioned along said third optical path for receiving said third image of the slide from said optical transmission means wherein the length of said third optical path is less than the length of said first optical path by said predetermined length, said second focus camera means being responsive to said activation signal for providing a focus-minus signal indicative of the focus of said image signal;

(h) focus signal processor means for determining the band-pass frequency components of said focus-plus signal and focus-minus signal to provide an array of focus-plus signals and an array of focus-minus signals wherein each element in the array is indicative of the high frequency component of a line from said first and second focus cameras, respectively;

(i) data processing means responsive to said array of focus-plus signals and said array of focus-minus signals for providing said slide focus signal to move said slide along said first optical path so that said image signal is in focus, said data processing means being further responsive to said light signal for providing said intensity signal to modulate the intensity of said flash of light, said data processing means being further constructed for providing said pulse signal and said activation signal to illuminate the slide and to obtain said image signal, said focus-plus signal and said focus-minus signal, said data processing means including image processor means for receiving said image signal and being responsive to said light signal for altering said image signal to correct for variations in the intensity of said flash of light, said data processing means further including memory means for storing said slide focus signal and said position signal, said data processing means being further constructed to determine when a non-focused image signal is provided that is not representative of a focused image of a portion of the specimen and for providing said slide scan signal, said activation signal, said pulse signal and said slide focus signal to obtain an image signal representative of a focused image of the portion of the specimen that was obtained by said non-focused image signal.

10. The apparatus as recited in claim 9 wherein said image processor means comprises an analog-to-digital converter for providing a digital output signal indicative of the magnitude of said image signal, said analog-to-digital converter including a reference input coupled to receive said light signal so that the digital output signal provided is a function of the magnitude of said image signal and said light signal.

11. An apparatus for rapid capture of focused microscopic images on a slide in a system using a camera for providing interlaced images at a predetermined video rate, the method comprising:

(a) means, coupled to the camera, for providing a first scan synchronization pulse at a first time;

(b) means, coupled to the camera, for providing a second scan synchronization pulse at a second time;

(c) means, attached to the camera, for moving the camera to a first predetermined position within a first predetermined time interval in response to the first scan synchronization pulse where the first predetermined time interval is initiated by the first scan synchronization pulse;

(d) means for illuminating a strobe in an optical path with the camera after the first predetermined time interval has elapsed so as to obtain a first interlaced image;

(e) means, attached to the camera, for moving the camera to a second predetermined position within a second predetermined time interval in response to the second scan synchronization pulse where the second predetermined time interval is initiated by the second scan synchronization pulse; and (f) means, coupled to the strobe, for firing the strobe after the second predetermined time interval has elapsed so as to obtain a second interlaced image where the first predetermined time interval and second predetermined time interval are selected so as to illuminate the strobe at the second predetermined position before the first interlaced image has been read out of the camera.

12. The apparatus as recited in claim 11 wherein the first predetermined time interval has a duration greater than or equal to a predetermined frame time.

13. The apparatus as recited in claim 11 wherein the second predetermined time interval has a duration greater than or equal to a predetermined frame time.

14. The apparatus as recited in claim 11 further comprising means for providing a coordinate list for deriving the first predetermined position and the second predetermined position.

15. The apparatus as recited in claim 11 wherein the first time and the second time bound an interval proportional to a maximum video rate allowed by the camera.

16. The apparatus as recited in claim 11 further comprising means, coupled to the camera, for processing a focus score for each captured image, wherein the camera is moved to a subsequent position for capturing an image while a focus score for a previous image is being processed.

17. The apparatus as recited in claim 16 further comprising means, coupled to the focus score processing means, for processing a focus quality score for each captured image, where the focus score is defined by a focus-plus signal array plus a focus-minus signal array and the focus quality score comprises the average of the focus-plus signal array and a focus-minus signal array and the focus quality score indicates the signal level of the image and thereby provides a confidence level for the focus score.

* * * * *